Patented July 2, 1929.

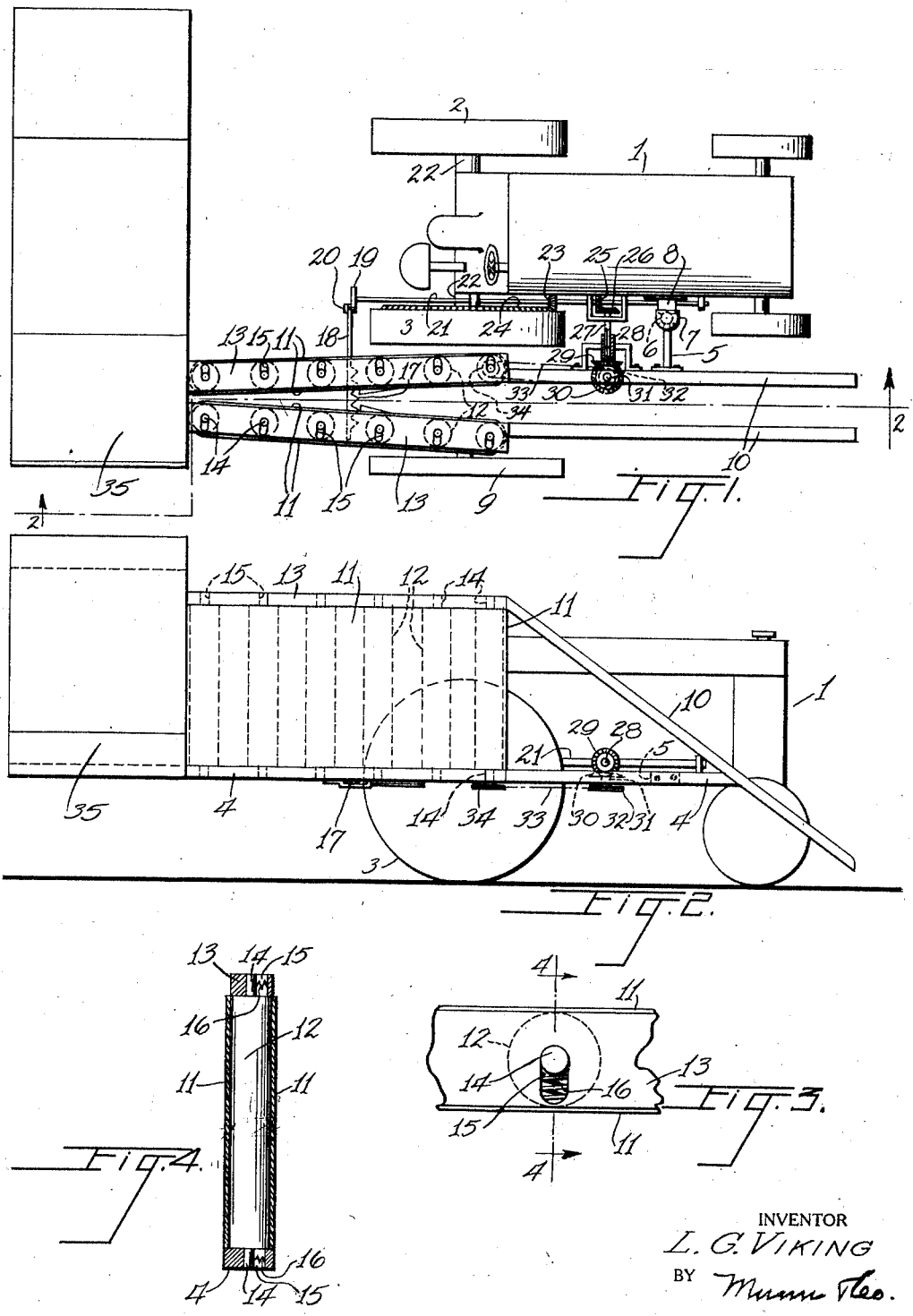

1,719,033

UNITED STATES PATENT OFFICE.

LARS GUSTAF VIKING, OF BUFFALO, KANSAS.

POWER-DRIVEN CORN-CUTTING ATTACHMENT FOR BINDERS.

Application filed September 17, 1925. Serial No. 56,948.

My invention relates to improvements in power driven corn cutting attachment for binders, and consists in the combinations, constructions, and arrangements herein described and claimed.

An object of my invention is to provide a device of the character described, which may be quickly and easily attached and detached to and from a tractor with which the device is used, and from which the device is driven, so as to readily permit of the use of the tractor in its normal capacity, when desired.

A further object of the invention is to provide a device of the character described, in which connections between the tractor and the device are substantially flexible, thereby eliminating undue strain upon the parts of the device as it passes over the field while in use.

A further object of the invention is to provide a device of the character described, in which a positive driving connection is established between the drive wheel of the tractor and the mechanism, so as to assure a uniform and continuous operation of the device independent of the traction of the device or tractor over the field.

A further object of the invention is to provide a device of the character described, which means is provided for yieldingly grasping the corn stalks prior to cutting, for holding the stalks in vertical positions parallel with one another during the cutting and for delivering while still in the stalks to a position over the tying platform, whereby the corn when released and permitted to drop upon the platform, may fall in uniform quantities and with stalks parallel and in proper condition for tying.

A further object of the invention is to provide a device of the character described, in which the device is disposed naturally at one side of the tractor, thus permitting the tractor to operate over that portion of the field which has already been cut and precluding the mutilation of uncut corn, as is the case of devices of a similar character which are attached at the rear of the tractor.

Other objects and advantages will appear in the following specification, and the novel features of the invention will be particularly pointed out in the appended claim.

My invention is illustrated in the accompanying drawings, forming part of this application, in which Figure 1 is a top plan view of an embodiment of the invention, Figure 2 is a sectional view along the line 2—2 of Figure 1, Figure 3 is an enlarged fragmentary view of a part of the device, as shown in Figure 1, and Figure 4 is a sectional view along the line 4—4 of Figure 3.

In carrying out my invention, I make use of the ordinary type of power driven tractor 1, having drive wheels 2 and 3. My improved corn cutting attachment is disposed at one side of the tractor 1, as shown in Figure 1, and consists mainly in a frame 4 which is provided with a laterally extending rigid rod 5 having a ball 6 at the outermost end thereof. This rod 5 extends toward the tractor 1, and the ball 6 is engaged with a socket 7 detachably secured to a member 8, which member is secured firmly to the tractor. The member 7 when removed from the member 8 permits the device to be detached from the tractor, and serves as a flexible connection between the tractor and the device.

The frame 4 has a wheel 9 rotatably mounted upon the off-side thereof for partially supporting the device.

My improved corn cutting device further consists of a pair of inclined spaced apart parallel guide members 10, which are disposed one on either side of the corn stalks, when the device is in use, and which serve to guide the stalks between two pairs of flexible inlet belts 11. The adjacent surfaces of the belts 11 are continuous with the upper ends of the guide members 10 at their forward ends, and converged toward one another at their rearmost ends. This construction causes the corn stalks to be pressed into close engagement with the belts, as the adjacent surfaces of the belts move rearwardly when the tractor is in operation in a manner hereinafter described.

The belts 11 are disposed upon a plurality of rotatably mounted rollers 12. These rollers 12 are mounted in the frame member 4 at the lowermost end and in the frame 13 at the upper end, by means of stub shafts 14 at each end of the rollers, which are projected through slots 15 in the frame. Springs 16 are provided for yieldingly maintaining the rollers in the position shown in Figure 1. This structure permits the rollers to give slightly and move outwardly, as the corn stalks pass between the adjacent surfaces of the belts 11, thus securely gripping the stalks.

A reciprocating type of cutting blade 17 is operatively mounted upon the frame 4, and is connected by means of a connecting rod 18 to an eccentric plate 19. The connection between the rod 18 and the eccentric plate 19 consists in a screw 20, which may be removed as when the device is detached from the tractor. The eccentric plate 19 is carried at one end of a shaft 21, which shaft is rotatably mounted at 22 to the tractor 1. The shaft 21 has a bevelled gear 23 therein which is in mesh with a bevelled gear of the ring type 24, carried on the inner face of the drive wheel 3.

A second bevelled gear 25 is carried by the shaft 21, which is in mesh with the bevelled gear 26 carried by a shaft 27, which is rotatably mounted and which extends toward the frame 4.

The outermost end of the shaft 27 is angular in cross section, and engages with a shaft 28 having an angular socket, into which the angular portion of the shaft 27 projects. This shaft 28 carries a bevelled gear 29, which is in mesh with a bevelled gear 30 carried by a shaft 31 which is rotatably mounted upon the frame 4. The lower end of the shaft 31 has a sprocket 32 thereon, and a flexible chain 33 is engaged with the sprocket 32 and a sprocket 34, which is mounted upon the lower stub shaft 14 of the innermost of the forwardly disposed rollers 12.

A packing and tying platform, elevator, and delivery chute, all of common construction, such as used with corn cutters and forming a part of the ordinary type of corn binders, is attached to the rearmost end of the frame 4, so that when corn is delivered from between the belts 11, it may fall directly upon the packing and tying platform, which is indicated at 35.

From the foregoing description of the various parts of the device, the operation thereof may be readily understood. When my improved corn cutting attachment is not in use, the tractor 1 is free for work in its normal capacity as a tractor. When it is desired to use the corn cutting attachment, the ball 6 is secured to the member 8 by attaching the socket 7, to which the ball is received, to the member 8. This mode of attachment is preferably that of the provision of threads upon the inner end of the socket 7 and upon the outer end of the member 8, for it should be understood that any well known means for connecting a ball and socket may be employed. The connecting rod 18 is secured to the eccentric plate 19 by the screw 20, and the device is ready for use.

As the compartment is run along side of the rows of corn, the members 10 are guided, one on either side of the rows. This causes the corn stalks to be guided between the adjacent surfaces of the belt 11, which surfaces are moving inwardly by virtue of the driving engagement between the drive wheel 3 and the first of the rollers 12 of the innermost set. The opposite side of the rollers and belt will necessarily move, due to frictional engagement of the corn therewith.

When the corn stalks reach the cutting blades 17, they will be severed from the lower portions which remain in the ground, by virtue of the moving blades. At this time the stalks are in an upright position parallel with one another, and securely gripped between the belts 11. Certain of the springs 16 will yield slightly if the bulk of the stalks is too great. As the belts continue to move and the device continues to move forwardly, this operation is repeated, and when the stalks arrive at the rearmost end of the belts, they will fall upon the tying platform 35 in uniform quantities and in parallel relationship with one another in proper condition for tying.

I claim:

A corn cutting attachment for a tractor having a drive wheel, comprising a frame, a rod rigidly secured at one end to said frame, a ball integral with the other end of said rod, a bracket rigidly secured to the tractor, a socket removably secured to said bracket and adapted to receive said ball, a pair of spaced-apart guide members extending longitudinally of the frame, means associated with the drive wheel of the tractor for cutting corn and the like which enters said frame between said guide members during a forward movement, flexible endless belts disposed in alignment with said guides, a plurality of rollers, said belts movably disposed upon groups of said rollers, said belts being adapted to move in opposite directions for engaging with the corn and for moving the corn rearwardly when the corn has been cut, stub shafts integral with said rollers, said frame having elongated openings for receiving said stub shafts, and spring means for holding each of said stub shafts and said rollers inwardly.

LARS GUSTAF VIKING.